May 11, 1926.  G. A. MITCHELL  1,584,186
FOCUSING INSTRUMENT FOR CAMERAS AND THE LIKE
Filed April 16, 1923

Inventor.
George A. Mitchell
by
his Attorney.

Patented May 11, 1926.

1,584,186

UNITED STATES PATENT OFFICE.

GEORGE A. MITCHELL, OF LOS ANGELES, CALIFORNIA, ASSIGNOR TO MITCHELL CAMERA CORPORATION, A CORPORATION OF CALIFORNIA.

FOCUSING INSTRUMENT FOR CAMERAS AND THE LIKE.

Application filed April 16, 1923. Serial No. 632,342.

This invention relates to devices, broadly termed finders, for accurately determining the field of view of a camera or the like, and for facilitating accurate focusing of the camera. Although the device finds its major use in connection with motion picture cameras, where the image on the film or on the ground glass is small, it will be readily understood that the invention is not necessarily restricted to use with motion picture cameras, but may be applied wherever a device of this character is desirable.

Figure 1:
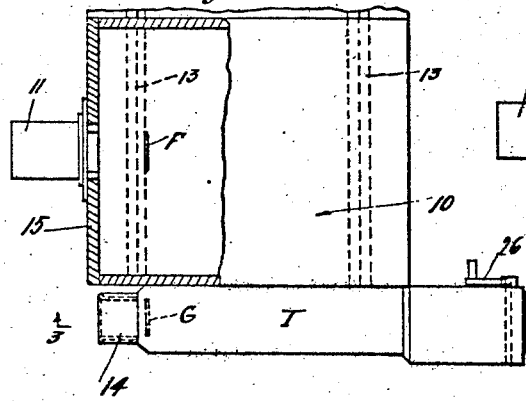
Figure 2:
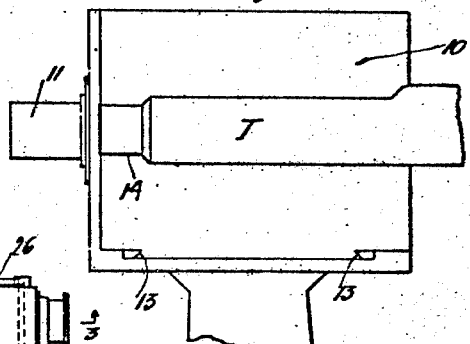
Figure 3:
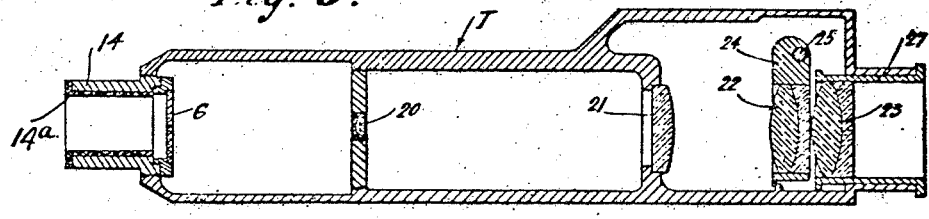
Figure 4:
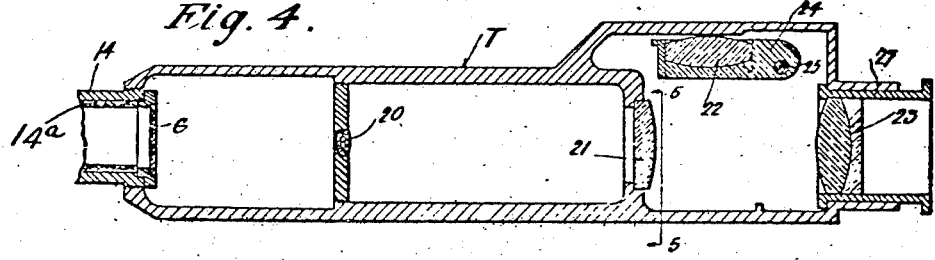
Figure 5:
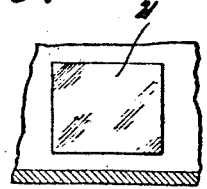

Speaking generally, the invention comprises an arrangement for both magnifying the image received on the ground glass, and for bringing that image apparently closer to the eye so that it may be more accurately viewed and inspected, for giving uniform illumination over the whole image, and for giving, by a simple arrangement, different powers of magnification. This statement of the invention is not intended to be exhaustive either on the invention itself or on its action. The nature of the invention, its objects, and its accomplishments, will be best understood from the following detailed description of a preferred and specific form of device that embodies the invention and is illustrative thereof; reference for this purpose being had to the accompanying drawings in which;

Fig. 1 is a diagram, in plan and horizontal section, showing the application of my device to a motion picture camera box; Fig. 2 is a side elevation of the same; Fig. 3 is an enlarged longitudinal section on line 3—3 of Fig. 1 showing the parts in position for the higher magnification; Fig. 4 is a similar view showing the parts in position for the lower magnification; and Fig. 5 is a detail section on line 5—5 of Fig. 4.

I show at 10 a camera case, as for a motion picture camera; showing the lens at 11 and indicating the normal position of the film behind the lens at F. The tube T of my device is mounted on the side of case 10; and means are provided for so shifting the parts that the ground glass G may be put into the position that film F normally occupies, so that the same image is thrown on the ground glass that is thrown on the film. In the particular arrangement shown in the drawings I accomplish this shift by shifting the camera case 10 sideways on ways 13. The front end of telescope T has an extension tube 14 lined with black felt as at 14ª, to make a light tight connection with front plate 15 of the camera case. With the tube in position behind lens 11, the image is thrown onto the ground glass and may then be viewed in the telescopic arrangement.

Tube T contains a small double convex objective lens 20 which views the image thrown on ground glass G. While I am giving a general description of the device I will also give typical dimensions and proportions of one design that has been worked out and is now in use. It will be understood of course that these dimensions are not a limitation on the invention but are only given for enabling those skilled in the art more readily to understand the device and more able to practice the invention. This objective lens 20 is of a focal length of 40 mm. and is located about 65.5 mm. from the ground surface of glass G.

Behind the objective lens there is next a collective lens 21 which is rectangular in form, and of dimensions about 32 mm. by 39 mm. (the same proportional shape as the standard picture area in motion pictures, but somewhat larger than the picture area). This collective lens 21 is a plano-convex lens and its forward plane side is located about 99.9 mm. from objective lens 20, (that is, from the rear face of lens 20). The objective lens throws a somewhat enlarged image onto the plane face of the collective lens. Then, behind the collective lens 21 there are two plano-convex eye-piece lenses 22 and 23. Lens 22 is set in a mounting 24 swung on a shaft 25 that may be moved by swinging handle 26 shown in Fig. 1, to swing lens 22 between the two positions shown in Figs. 3 and 4. Eye piece lens 23 is mounted in a sleeve 27 that may be moved longitudinally between the two positions shown in Figs. 3 and 4. When lens 22 is in the position shown in Fig. 3 the space between the lens 21 and lens 22 is about 33.5 mm. while the space between the lenses 22 and 23 is about 1 mm. The focal length of the collective lens 21 is about 69 mm. and each of the lenses 22 and 23 is about 88 mm. When the two lenses are in the position shown in Fig. 3 the magnifying power is about ten times: and the image viewed by the eye is apparently about in the plane of collective lens 21. When the lenses are in the position shown in Fig. 4 with lens 22 swung out of the way, lens 23 is moved outwardly to its focusing position, the magnifying power is about five times, the image showing apparently about in the plane of collective lens 21. The size, and the rectangular shape, of lens 21 are such as to make that lens take the whole of the rectangular image. At the lower magnifying power, using only lens 23, the whole of this rectangular image may be viewed. The rectangular lens 21 furthermore, gives illumination over the whole of the rectangular image, illuminating the corners of the image as well as the central part. When the higher magnifying power is used, the field is limited to a circular field whose diameter is a little less than the vertical or smaller dimension of the rectangular image.

In most motion picture cameras the image as thrown on the film or as thrown onto a ground glass is inverted. My instrument arrangement erects the image as well as magnifies it.

The focal length of the combined lenses 22 and 23 is of course somewhat shorter than the focal length of either lens alone. The position of the two lenses for high power magnification has been given; for low power magnification the lens 23 is drawn out to the position shown in Fig. 4; the distance from collective lens 21 to lens 23 then being about 69.9 mm. The position of lens 23 will of course depend somewhat upon obtaining the correct focus for the individual eye.

The lenses, excepting rectangular lens 21, are circular. Their comparative diameters are proportionately illustrated in the drawings.

The function of the ground glass is to receive the image from the photographic lens 11—to receive the same image that is afterwards to be received on the film. This image is real and therefore can be just as well seen through the instrument whether or not the ground glass is used, but in practice the use of the ground glass is preferable as it facilitates the determination of proper focus of lens 11 correctly in the plane of the film. However, if a camera operator has once marked the exact position of the eye piece that gives correct focus, for his own eye, of an image on collective lens 21, then with the eye piece in that exact position he knows that all lack of focus of a scene is due to the photographic lens not being properly focused in the plane of the film or of the ground glass. Being able to see the image at that plane, whether the ground glass is used or not, he may bring lens 11 to proper focus by simple adjustment of that lens. The ground glass, although useful, may therefore be dispensed with.

Likewise, the collective lens 21 is not absolutely necessary as the image formed by objective 20 may be viewed directly through the eye piece. But the collective lens is preferred as it helps not only in the magnification but also in the uniform illumination of the finally viewed image.

Having described a preferred form of my invention, I claim:

1. A focusing instrument, comprising a rectangular ground glass, an objective lens, a rectangular collective lens onto which the objective throws an image of the ground glass, and an eye-piece arranged for viewing the image on the collective lens.

2. A focusing instrument, comprising a ground glass, an objective lens, a plano-convex collective lens onto whose plane surface the objective throws an image of the ground glass, and an eye-piece arranged for viewing the image on the collective lens.

3. A focusing instrument, comprising a rectangular ground glass, an objective lens, a rectangular collective lens onto which the objective throws an image of the ground glass, and an eye-piece, comprising two eye-piece lenses adapted to be used together or one alone arranged for viewing the image on the collective lens.

4. A focusing instrument, comprising a rectangular ground glass, an objective lens, a rectangular collective lens onto which the objective throws an image of the ground glass, and an eye-piece arranged for viewing the image on the collective lens and comprising two eye-piece lenses adapted to be used together or one alone, a laterally shifting mounting for one eye-piece lens and a longitudinally shifting mounting for the other.

5. A focusing instrument, comprising a ground glass, an objective lens, a collective lens onto which the objective throws an image of the ground glass, and an eye piece arranged for viewing the image on the collective lens and comprising a pair of lenses one of which has longitudinal adjustability, and the other lateral adjustability to be moved to and from the optical axis of the instrument, the two eyepiece lenses being less than their focal distance apart when the second mentioned one is on the optical axis.

6. A focusing instrument for a camera or the like, comprising an objective lens adapted to view an image cast by a photographic lens, a collective lens arranged behind the objective and onto which the objective throws its image of the photographic lens image, and an eye-piece arranged for viewing the image on the collective lens and comprising two eye-piece lenses adapted to be used together or one alone.

7. A focusing instrument for a camera or the like, comprising an objective lens adapted to view an image cast by a photographic lens, a collective lens arranged behind the objective and onto which the objective throws its image of the photographic lens image, and an eye-piece arranged for viewing the image on the collective lens and comprising two eyepiece lenses adapted to be used together or one alone, one of said eyepiece lenses having adjustability along the optical axis, and the other having lateral adjustability to be moved to and from the optical axis of the instrument, the two eyepiece lenses being less than their focal distance apart when the second mentioned one is on the optical axis.

In witness that I claim the foregoing I have hereunto subscribed my name this 3rd day of April, 1923.

GEORGE A. MITCHELL.